US012133059B2

(12) United States Patent
Lee et al.

(10) Patent No.: US 12,133,059 B2
(45) Date of Patent: Oct. 29, 2024

(54) THIN LOUDSPEAKER

(71) Applicant: National Central University, Taoyuan (TW)

(72) Inventors: Po-Lei Lee, Taoyuan (TW); Kuo-Kai Shyu, Taoyuan (TW)

(73) Assignee: NATIONAL CENTRAL UNIVERSITY, Taoyuan (TW)

( * ) Notice: Subject to any disclaimer, the term of this patent is extended or adjusted under 35 U.S.C. 154(b) by 292 days.

(21) Appl. No.: 17/952,918

(22) Filed: Sep. 26, 2022

(65) Prior Publication Data

US 2023/0412984 A1 Dec. 21, 2023

(30) Foreign Application Priority Data

May 25, 2022 (TW) ................................. 111119397

(51) Int. Cl.
*H04R 25/00* (2006.01)
*H04R 7/04* (2006.01)
*H04R 7/22* (2006.01)
*H04R 9/02* (2006.01)

(52) U.S. Cl.
CPC ................ *H04R 7/04* (2013.01); *H04R 7/22* (2013.01); *H04R 9/025* (2013.01)

(58) Field of Classification Search
CPC . H04R 7/04; H04R 7/22; H04R 9/025; H04R 7/10; H04R 9/047
USPC .......................................................... 381/412
See application file for complete search history.

(56) References Cited

U.S. PATENT DOCUMENTS

| | | | |
|---|---|---|---|
| 2018/0115832 A1 | 4/2018 | Hui et al. | |
| 2021/0049992 A1 | 2/2021 | Weber et al. | |
| 2021/0168480 A1 | 6/2021 | Watanabe | |

FOREIGN PATENT DOCUMENTS

| | | | | |
|---|---|---|---|---|
| CN | 110366077 A | * 10/2019 | | |
| CN | 111385721 A | 7/2020 | | |
| CN | 112019979 A | 12/2020 | | |
| JP | WO-2018159455 A1 | 11/2019 | | |
| TW | 201204062 A | 1/2012 | | |
| TW | 201225685 A | 6/2012 | | |
| TW | I451769 | 9/2014 | | |
| WO | WO-03073787 A1 | * 9/2003 | .............. | H04R 7/04 |

OTHER PUBLICATIONS

CN-1103660-A. Translation (Year: 2019).*
WO-03073787-A1. Translation (Year: 2003).*

* cited by examiner

*Primary Examiner* — Phylesha Dabney
(74) *Attorney, Agent, or Firm* — MUNCY, GEISSLER, OLDS & LOWE, P.C.

(57) ABSTRACT

A thin loudspeaker is provided. The thin loudspeaker includes a small magnet and a thin coil diaphragm. The coil diaphragm has a plurality of planar coils and a membrane. The membrane has a plurality of laminated substrates. The planar coils are interconnected, stacked, and respectively formed on the substrates. The magnet is disposed to contact the underside of the coil diaphragm along the common central axis of the planar coils.

10 Claims, 5 Drawing Sheets

100

THIN LOUDSPEAKER

CROSS REFERENCE TO RELATED APPLICATION

This application claims the priority of Taiwan Patent Application No. 111119397, filed on May 25, 2022, entitled "THIN SPEAKER," and the disclosure of which is incorporated herein by reference.

FIELD OF INVENTION

The present invention relates to a loudspeaker, and more particularly, to a thin loudspeaker.

BACKGROUND OF INVENTION

Nowadays, loudspeakers (speakers) can be mainly categorized into piezoelectric type, electrostatic type and dynamic type by the operation principle.

The reasons that piezoelectric loudspeakers could produce sound are piezoelectric material can be deformed to push vibration diaphragms. The piezoelectric loudspeakers have a simple structure and do not require an external sound box. The disadvantage of the piezoelectric loudspeakers is large distortion and unstable operation. In addition, since the area of a piezoelectric element when compared with the area of a diaphragm is relatively small, the piezoelectric loudspeakers are unable to produce large amplitude, resulting in poor efficiency of sound production. Furthermore, the piezoelectric loudspeakers can only achieve superior performance in a high-frequency range, and exhibit poor performance and high distortion in a low-frequency range. Although the piezoelectric loudspeakers use a thin diaphragm as a sound-producing element, it requires additional configuration for connecting a driving circuit, a conductive structure of the piezoelectric element, and a fixed frame supporting the vibration diaphragm. Therefore, the structures of the piezoelectric loudspeakers are still quite complicated, resulting in increased manufacturing costs.

Electrostatic loudspeakers produce sound based on the principle that unlike charges attract each other and like charges repel each other: a very light vibration diaphragm is covered with one type of charges, and one large parallel stator is provided to each of both sides of the electrostatic diaphragm; the two parallel stators generate a uniform magnetic field, which drives the diaphragm to vibrate. The related invention patent is Taiwan laid-open No. TW 201204062A, entitled "Electrostatic speaker and manufacturing method thereof and conducting plate of the speaker." The disadvantages of the electrostatic speakers are that they are inefficient, easy to absorb dust (because its area is lager), and the bigger the diaphragm, the higher the distortion. Besides, the electrostatic speakers are driven by a high DC power supply, and thus an external bulky and expensive amplifier is required.

Dynamic loudspeakers produce diaphragm vibration by making an energized conducting wire move in a magnetic field to lead the conducting wire to vibrate a diaphragm. The related invention patent is US laid-open No. US 20210168480A1, entitled "Speaker Device." The dynamic loudspeakers include permanent magnets, coils and sound boxes, whose structure require large magnets and long coils to generate enough force to push the diaphragm. Therefore, it is difficult to minimize the size due to volume of magnets and weight of coils.

Moreover, a thin loudspeaker similar to the dynamic loudspeakers is Taiwan invention patent No. TW 1451769 entitled "Electro-acoustic transducer and method of manufacturing the same," whose structure includes a magnetic field generator, a magnet and a flexible insulating substrate. In this invention patent, a cavity creates a long distance between the magnet and the magnetic field generator, which causes the magnetic force to decay, and decreases the efficiency of sound production.

SUMMARY OF INVENTION

In view of the above problems of the prior art, the present invention improves the deficiencies of the prior art, and proposes a lightweight and low-cost thin loudspeaker.

The present invention provides a thin loudspeaker, comprising: a magnet; and a coil diaphragm, including a plurality of planar coils and a membrane, wherein the membrane has a plurality of laminated substrates, and the plurality of planar coils are interconnected, stacked and respectively formed on the substrates; wherein the magnet is disposed to contact the underside of the coil diaphragm along the common central axis of the plurality of planar coils.

In one embodiment of the present invention, the membrane is a flexible circuit board.

In one embodiment of the present invention, the thin loudspeaker further comprises a resonance box, interacting with the magnet and the coil diaphragm.

In one embodiment of the present invention, the thin loudspeaker further comprises a magnet holder, wherein the magnet is attached to the resonance box by the magnet holder.

In one embodiment of the present invention, the thin loudspeaker further comprises a fixing ring, wrapping around the coil diaphragm.

The present invention provides a thin loudspeaker, comprising: a plurality of magnets; and a coil diaphragm, including a plurality of planar coils and a membrane, wherein the membrane has two laminated substrates, and the planar coils are interconnected and formed dispersedly on the substrates; wherein the magnets respectively correspond to the planar coils, and are disposed to contact the underside of the coil diaphragm along the central axis of a respective corresponding planar coil.

In one embodiment of the present invention, the membrane is a flexible circuit board.

In one embodiment of the present invention, the thin loudspeaker further comprises a resonance box, interacting with the magnets and the coil diaphragm.

In one embodiment of the present invention, the thin loudspeaker further comprises a plurality of magnet holders, wherein the magnets are attached to the resonance box by the magnet holders.

In one embodiment of the present invention, the thin loudspeaker further comprises a fixing ring, wrapping around the coil diaphragm.

DETAILED DESCRIPTION OF PREFERRED EMBODIMENTS

Figure 1:
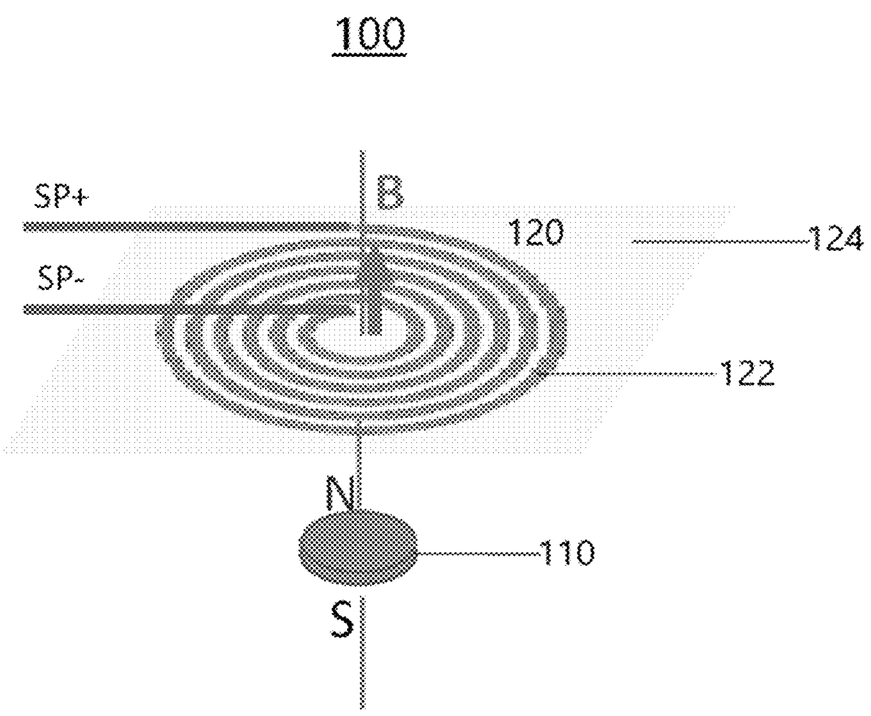
FIG. 1 is a schematic diagram of the structure of a thin loudspeaker of the present invention.

In order to understand the above and other objectives, features, and advantages of the present invention more easily, the following exemplifies the preferred embodiments of the present invention, combined with the accompanying drawings, and describe in detail as follows.

The drawings in the application are just for illustration. Specifically, the proportions, dimensions or appearances of the elements in the drawings are for illustration, and do not represent the proportions, dimensions or appearances of the real elements. For example, the thicknesses, lengths and proportions of the magnet(s) and the diaphragm(s) in the present invention are not presented according to the physical size of a real product. In addition, for the sake of simplicity, a plurality of planar coils in the following may only be presented as a single planar coil in the drawings in some cases. Likewise, in the following, a diaphragm with multiple substrates is only represented as a diaphragm with a single substrate in the drawings in some cases.

Firstly, please refer to FIG. 1. FIG. 1 is a schematic diagram of a structure of a thin loudspeaker 100 of the present invention. In the present invention, a thin loudspeaker 100 includes a magnet 110 and a coil diaphragm 120. Preferably, the magnet 110 is a thin strong magnet or a strong magnetic sheet with a thickness of about 0.5 mm. In one embodiment, the coil diaphragm 120 may be made up of a small-sized and light-weighted single planar coil 122, and a thin membrane 124. Preferably, the coil diaphragm 120 is made up of a plurality of planar coils 122, and a membrane 124. The membrane 124 is made up of multi-layered substrates (that is, a plurality of laminated substrates). The membrane 124 is a flexible (pliable) membrane, such as a flexible circuit board (FPC), and is not limited thereto, and its thickness is about 0.1-0.3 mm. In the embodiment, the flexible circuit board can be made from materials such as Copper Clad Laminate (CCL), Polyester (PET), or Polyimide (PI), etc., according to different range or characteristics.

In the case of the single planar coil 122, the magnet 110 is generally disposed below the coil diaphragm 120 along the central axis of the planar coil 122, and preferably contacts the underside of the coil diaphragm 120. In the case of the plurality of planar coils 122, the planar coils 122 are interconnected and stacked, and each planar coil 122 is respectively formed on each substrate of the membrane 124. It should be noted that the planar coils 122 are stacked in accordance with a common central axis. That is, the central axes of the planar coils 122 are overlapped with each other. The magnet 110 is disposed below the coil diaphragm 120 along the common central axis of the planar coils 122. Preferably, the magnet 110 is close to the lower surface of the coil diaphragm 120.

Because the magnetic field B of a planar coil is concentrated at the center point, in a case where a magnet is placed under the center of the planar coil, when current is output from the signal terminals (SP+ and SP−) of a signal amplifier, the planar coil and the magnet interact (repel or attract each other), thereby driving a diaphragm to vibrate so as to produce sound. In a preferred embodiment, the magnet 110 and the coil diaphragm 120 are in contact with each other; however, as long as the magnet 110 and the coil diaphragm 120 are close enough to each other, they can still interact after the planar coil(s) 122 is/are energized. Regarding the preferred embodiment, it will be described in detail below.

Figure 2:
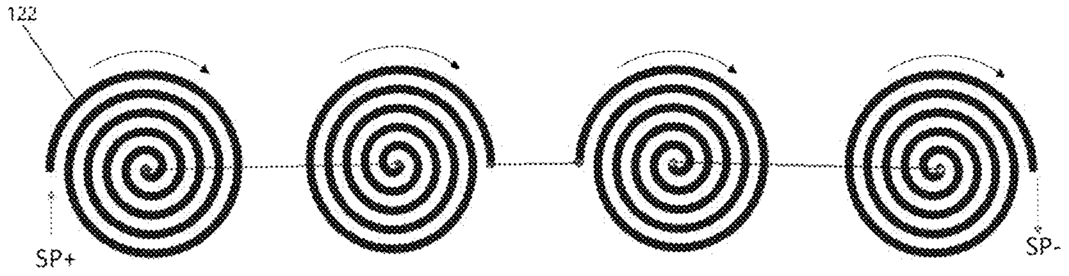
FIG. 2 is a schematic diagram of connected coils in a coil diaphragm of the thin loudspeaker of the present invention.
Figure 3:
FIG. 3 is a schematic side view of the thin loudspeaker of the present invention.

Please refer to FIG. 2 and FIG. 3. FIG. 2 is a schematic diagram of connected coils in the coil diaphragm of the thin loudspeaker of the present invention. FIG. 3 is a schematic side view of the thin loudspeaker of the present invention. In some embodiments, the coil diaphragm 120 may include one planar coil, two planar coils, or more. In a preferred embodiment of the present invention, taking four planar coils as an example, the first coil to the fourth coil is sequentially from left to right, and the four planar coils 122 are connected to each other. The external end of the first coil is connected to the signal terminal SP+ of the signal amplifier, the central end of the first coil is connected to the central end of the second coil, the external end of the second coil is connected to the external end of the third coil, the central end of the third coil is connected to the central end of the fourth coil, and the external end of the fourth coil is connected to the signal terminal SP− of the signal amplifier, as shown in FIG. 2. Each of the planar coils 122 is respectively formed on each substrate of the membrane 124, as shown in FIG. 3. In FIG. 2, the arrows represent direction of currents (currents represent signals of sound source). The signals of sound source to be played are input to a sound source amplifier (not shown), and then output from the signal terminals SP+ and SP−, and then audible sound is generated by the interaction of the components in the thin loudspeaker 100. The plurality of connected planar coils 122 are equivalent to a coil of many turns, and generate magnetic fields whose directions are the same due to the currents whose directions are the same, thereby outputting stronger power, causing stronger diaphragm vibration, and thus generating higher sound power. Moreover, the planar coils 122 are covered by the diaphragm 124, so that the waterproof effect can be realized.

Figure 4:
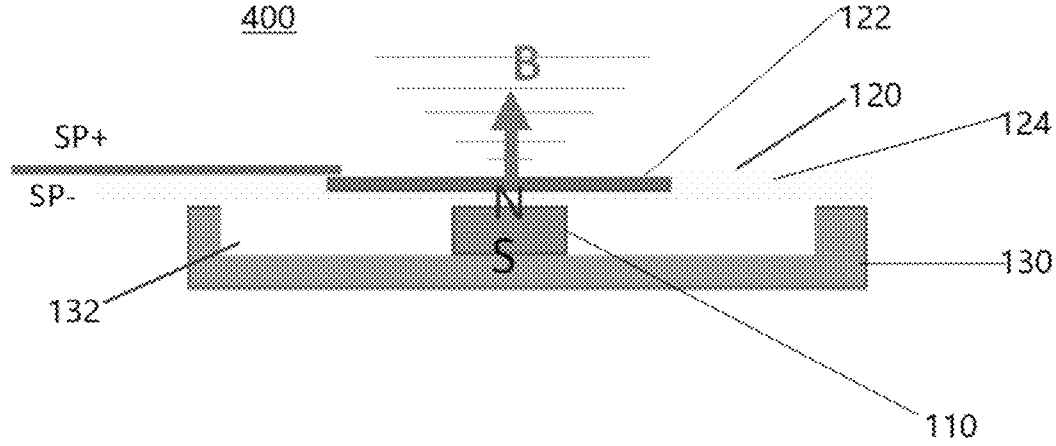
FIG. 4 is a schematic diagram of an embodiment of the thin loudspeaker of the present invention.

Please refer to FIG. 4. FIG. 4 is a schematic diagram of an embodiment of the thin loudspeaker 400 of the present invention. The loudspeaker 400 of FIG. 4 further includes a resonance box 130. A resonance cavity 132 is formed in the resonance box 130. The magnet 110 and the coil diaphragm 120 can be placed in the resonant cavity 132. The sound wave generated by the magnet 110 and the coil diaphragm 120 may resonate with the resonance box 130 in the resonance cavity 132, thereby producing larger volume.

Figure 5:
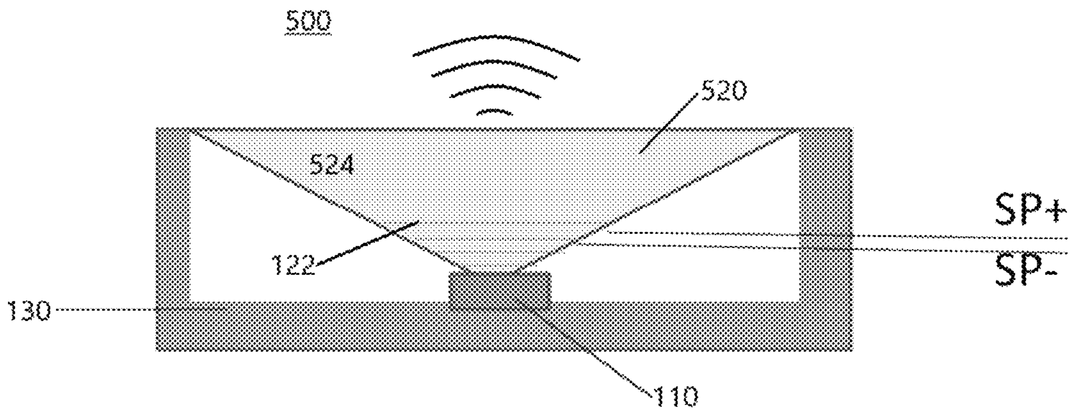
FIG. 5 is a schematic diagram of another embodiment of the thin loudspeaker of the present invention.

Please refer to FIG. 5. FIG. 5 is a schematic diagram of another embodiment of the thin loudspeaker 500 of the present invention. The loudspeaker 500 of FIG. 5 is similar to the loudspeaker 400 of FIG. 4, except that the diaphragm 524 (e.g., a flexible circuit board) of FIG. 5 is tapered shape, but not limited thereto. Preferably, the plurality of planar coils 522 are disposed at the top portion (the tip portion) of the taper-shaped diaphragm 524. The magnet 110 is disposed to contact the vertex of the diaphragm 524.

Figure 6:
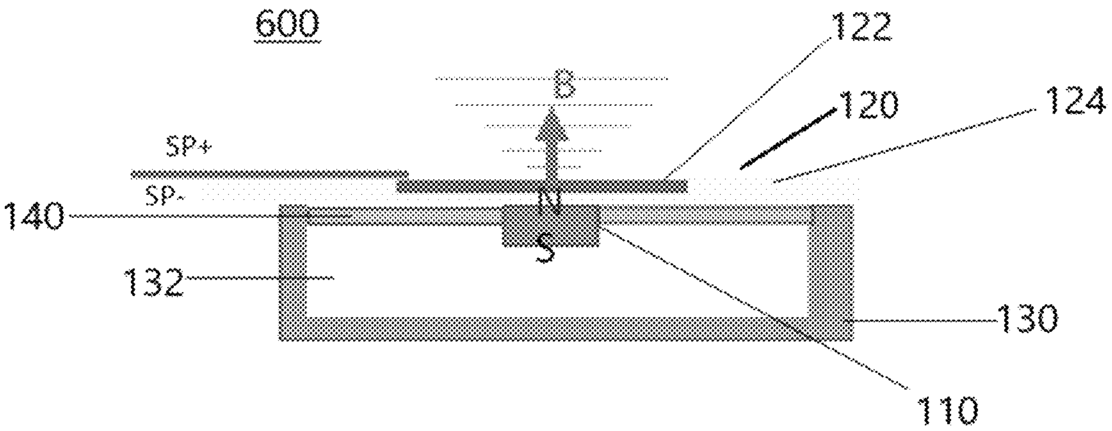
FIG. 6 is a schematic diagram of another embodiment of the thin loudspeaker of the present invention.

Please refer to FIG. 6. FIG. 6 is a schematic diagram of another embodiment of the thin loudspeaker 600 of the present invention. The loudspeaker 600 of FIG. 6 further includes a magnet holder 140. The magnet 110 can be fixed in the resonance box 130 by the magnet holder 140. In the embodiment of FIG. 6, the magnet 110 is not placed at the bottom of the resonance box 130 as shown in FIG. 5, instead, the magnet 110 is suspended from the opening of the resonance box 130 by the magnet holder 140. The coil diaphragm 120 in contact with the magnet 110 is offset above the opening of the resonance box 130.

Figure 7:
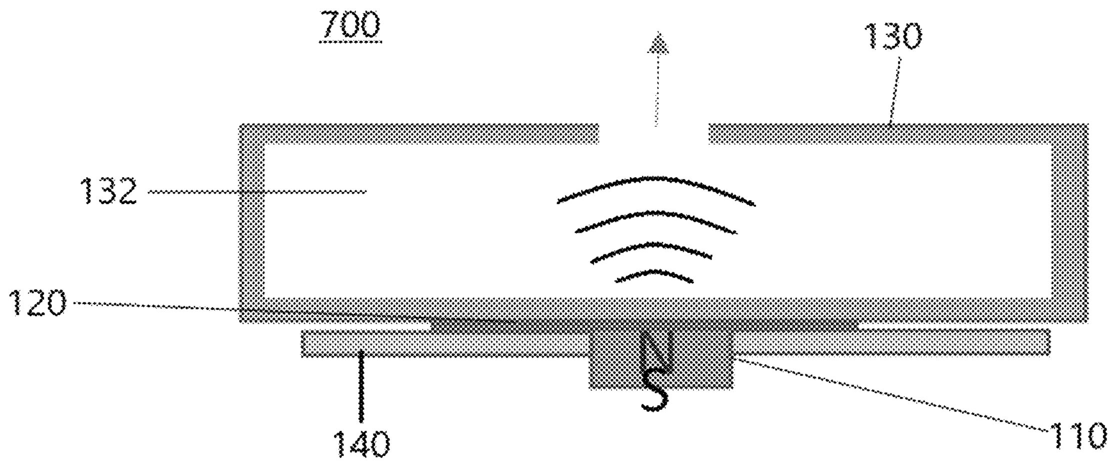
FIG. 7 is a schematic diagram of another embodiment of the thin loudspeaker of the present invention.

Please refer to FIG. 7. FIG. 7 is a schematic diagram of another embodiment of the thin loudspeaker 700 of the present invention. Similar to the loudspeaker 600 of FIG. 6, the loudspeaker 700 of FIG. 7 also includes a magnet holder 140 for fixing the magnet 110 at the resonance box 130. The difference between the loudspeaker 700 of FIG. 7 and the loudspeaker 600 of FIG. 6 is that the magnet 110 and the coil diaphragm 120 are both arranged outside the resonance box 130 and on the underside of the resonance box 130. In addition, the opening of the resonance box 130 is reduced (which is beneficial to enhance resonance). The magnet 110 and the coil diaphragm 120 can be fixed on the resonance box 130 by the magnet holder 140.

Figure 8:
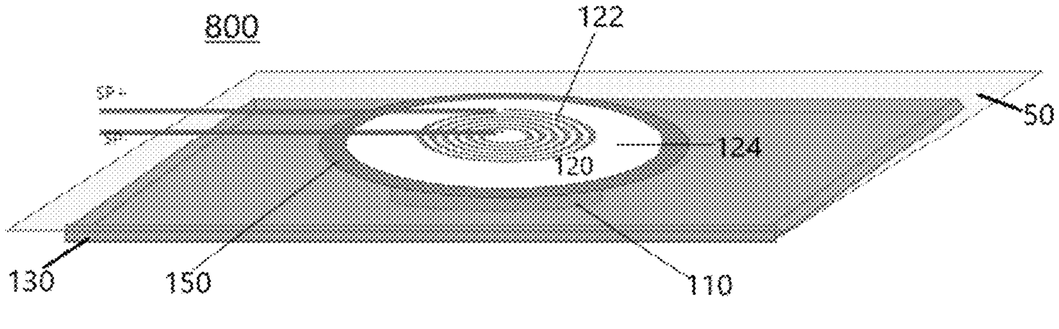
FIG. 8 is a schematic diagram of another embodiment of the thin loudspeaker of the present invention.

Next, please refer to FIG. 8. FIG. 8 is a schematic diagram of another embodiment of the thin loudspeaker 800 of the present invention. The thin loudspeaker 800 of FIG. 8 further includes a diaphragm fixing ring 150. The diaphragm fixing ring 150 can be made according to the shape of the coil diaphragm 120 (for example, if the coil diaphragm 120 in FIG. 8 is round, the fixing ring 150 can be made as a round ring; if the coil diaphragm 120 is rectangle, the fixing ring 150 can be made as a quadrangular ring) to wrap around the coil diaphragm 120, such that the coil diaphragm 120 can be fixed to any flat surface 50, such as the desk surface, wall surface, glass surface and box surface, etc., by the diaphragm fixing ring 150.

Figure 9:
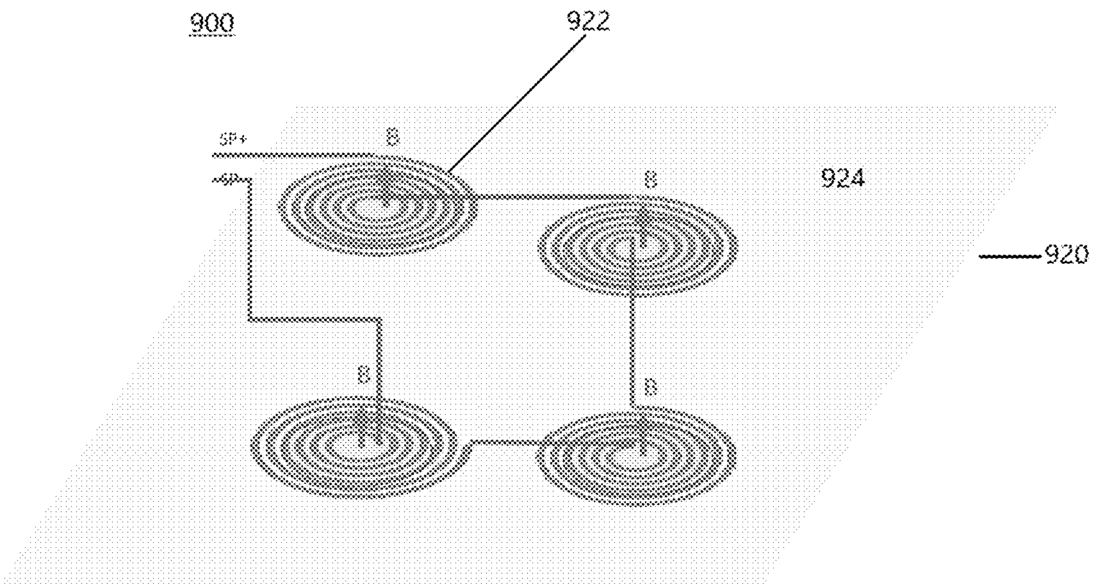
FIG. 9 is a schematic diagram of a coil diaphragm of another thin loudspeaker of the present invention.
Figure 10:
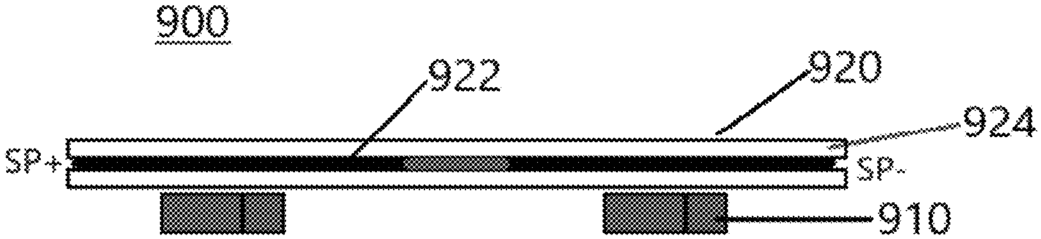
FIG. 10 is a schematic side view of another thin loudspeaker of the present invention.

Next, please refer to FIG. 9 and FIG. 10. FIG. 9 is a schematic diagram of a coil diaphragm of another thin loudspeaker 900 of the present invention. FIG. 10 is a schematic side view of another thin loudspeaker 900 of the present invention. Different from the coil diaphragm 120 of FIG. 2 and that of FIG. 3, a plurality of planar coils 922 of a coil diaphragm 920 in FIG. 8 and FIG. 9 are dispersedly formed on a membrane 924 (e.g., a flexible circuit board). Besides, the connection manner of the planar coils 922 is also different from that of the planar coils 122 of the coil diaphragm 120 shown in FIG. 2 and FIG. 3. Further, each of the planar coils 922 on the coil diaphragm 920 has a corresponding magnet 910. The corresponding magnets 910 are disposed to contact the coil diaphragm 920 along the center axis of each planar coil 922. Each planar coil 922 interacts with the corresponding magnet 910 (repel and attract each other), thereby enhancing the vibration of the diaphragm 924 as a whole.

In other modified embodiments, the thin loudspeaker of the present invention can be further simplified to consist of a magnetic diaphragm (or magnetic paper) and a planar coil. Likewise, the planar coil can be optionally covered by the magnetic diaphragm (or not covered by the magnetic diaphragm). Since the magnetic diaphragm is magnetic, when the planar coil is energized, the magnetic field generated by which may interact with the magnetic field of the magnetic diaphragm so as to cause diaphragm vibration.

The structure of the thin loudspeaker in the present invention is simpler when compared with the prior art. The thin loudspeaker produces sound by combining a planar coil and a flexible diaphragm, and cooperating with a mini strong magnet to accomplish diaphragm vibration. The thin loudspeaker of the present invention can be cooperated with various audio amplifiers, and is different from ceramic loudspeakers and electrostatic loudspeakers which require a booster circuit to operate. Therefore, it has advantages in cost and manufacturing process.

The above is only exemplary, rather than restrictive. Any equivalent modifications or changes without departing from the spirit and scope of the present invention should fall within the scope of the appended claims.

What is claimed is:

1. A thin loudspeaker, comprising:

a magnet; and a coil diaphragm, including a plurality of planar coils and a membrane, wherein the membrane has a plurality of laminated substrates, and the plurality of planar coils are interconnected, stacked and respectively formed on the substrates;

wherein the magnet is disposed to contact the underside of the coil diaphragm along the common central axis of the plurality of planar coils.

2. The thin loudspeaker according to claim 1, wherein the membrane is a flexible circuit board.

3. The thin loudspeaker according to claim 1, further comprising a resonance box, interacting with the magnet and the coil diaphragm.

4. The thin loudspeaker according to claim 3, further comprising a magnet holder, wherein the magnet is attached to the resonance box by the magnet holder.

5. The thin loudspeaker according to claim 1, further comprising a fixing ring, wrapping around the coil diaphragm.

6. A thin loudspeaker, comprising:

a plurality of magnets; and a coil diaphragm, including a plurality of planar coils and a membrane, wherein the membrane has two laminated substrates, and the planar coils are interconnected and dispersedly formed on the substrates;

wherein the magnets respectively correspond to the planar coils, and are disposed to contact the underside of the coil diaphragm along the central axis of a respective corresponding planar coil.

7. The thin loudspeaker according to claim 6, wherein the membrane is a flexible circuit board.

8. The thin loudspeaker according to claim 6, further comprising a resonance box, interacting with the magnets and the coil diaphragm.

9. The thin loudspeaker according to claim 8, further comprising a plurality of magnet holders, wherein the magnets are attached to the resonance box by the magnet holders.

10. The thin loudspeaker according to claim 6, further comprising a fixing ring, wrapping around the coil diaphragm.

* * * * *